(12) United States Patent
McCrady (10) Patent No.: US 9,539,906 B2
(45) Date of Patent: Jan. 10, 2017

(54) ECOCHARGE POWERED PLANES AND DRONES

(71) Applicant: Dennis Drake McCrady, Albuquerque, NM (US)

(72) Inventor: Dennis Drake McCrady, Albuquerque, NM (US)

( * ) Notice: Subject to any disclaimer, the term of this patent is extended or adjusted under 35 U.S.C. 154(b) by 0 days.

(21) Appl. No.: 15/151,829

(22) Filed: May 11, 2016

(65) Prior Publication Data

US 2016/0280075 A1    Sep. 29, 2016

(51) Int. Cl.
*H02K 47/00* (2006.01)
*B60L 8/00* (2006.01)
*B64D 27/24* (2006.01)
*B64C 39/02* (2006.01)

(52) U.S. Cl.
CPC ............... *B60L 8/00* (2013.01); *B64C 39/026* (2013.01); *B64D 27/24* (2013.01); *H02K 47/00* (2013.01); *B64C 2201/066* (2013.01)

(58) Field of Classification Search
CPC .......... B60L 8/00; B64C 39/026; B64D 27/24; H02K 47/00; Y10S 74/09; Y02T 10/7083; Y02T 10/641

USPC ........................................................ 310/68 R
See application file for complete search history.

(56) References Cited

U.S. PATENT DOCUMENTS

| 9,130,414 | B2 * | 9/2015 | McCrady | ................. H02K 3/04 |
| 9,219,402 | B2 * | 12/2015 | McCrady | ............... H02K 53/00 |
| 2014/0285047 | A1 * | 9/2014 | McCrady | ................. H02K 3/04 310/154.01 |
| 2015/0360571 | A1 * | 12/2015 | McCrady | ................. H02K 3/04 191/10 |

* cited by examiner

*Primary Examiner* — Terrance Kenerly (57) ABSTRACT

The earth's magnetic field has not been mined as a source of energy. With average field strength of $0.5 \times 10^{-4}$ Tesla around the world it is easy to understand why. A disruptive technology is needed to mine the earth's magnetic field. Such a technology, graphene, is now at an early stage of development with excellent properties in the form of high conductivity, low resistivity, durable, light weight, low cost sheets. Multiple sheets of graphene provide a significant multiplier to earth's magnetic field yielding a feasible source of ecologically clean power. Graphene based EcoCharge units can be driven by electric motors putting graphene in motion to mine the earth's magnetic field. Estimates show that for a Solar Impulse 2 like electric plane, eight EcoCharge units weighing 64 lbs generate 60 kW RMS continuously replacing 3,000 lbs of photovoltaic cells generating 50 kW RMS during the day only.

22 Claims, 5 Drawing Sheets

| Component | Weight Estimate Ounces (oz) |
|---|---|
| Graphene sheets[1] x 2 | .066 |
| Commutator x 2 | 6 |
| Bearing x 2 | 6 |
| Cover x 2 | 8 |
| Drive Shaft[2] (DS) x 2 | 76 |
| Orthogonal DS[2] (ODS) x 2 | 76 |
| Vertical Drive Shaft[3] (VDS) x 2 | 38 |
| Motion Translation x 2 (ABS) | 32 |
| EcoCharge Coupler (ABS) | 8 |
| TOTAL | 250.066 [= 15.63 lbs] |

[1] Density of graphene ($\rho$) = .77 $mg/m^2$
Total area of 4059 graphene sheets = .2m x 1.493m x 4059 = 1212 $m^2$
Weight of 4059 graphene sheets = 1212 x .77 = 933 mg → 933 ÷ 28.35 = .033oz
[2] DS = ODS = ABS tube = 2.5" OD x 2.25" ID x 5.5' long
[3] VDS = ABS tube = 2.5" OD x 2.25" ID x 2.75' long

FIG.5

ECOCHARGE POWERED PLANES AND DRONES

CROSS REFERENCE TO RELATED APPLICATIONS (IF ANY)

U.S. Pat. No. 9,130,414 B2
U.S. patent application Ser. No. 14/835,098
U.S. Pat. No. 9,219,402 B2
U.S. patent application Ser. No. 14/936,096

STATEMENT OF FEDERALLY SPONSORED RESEARCH/DEVELOPMENT (IF ANY)

None.

NAMES OF THE PARTIES TO A JOINT RESEARCH AGREEMENT IF THE CLAIMED INVENTION WAS MADE AS A RESULT OF ACTIVITIES WITHIN THE SCOPE OF A JOINT RESEARCH AGREEMENT

None.

REFERENCE TO A "SEQUENCE LISTING," A TABLE, OR A COMPUTER PROGRAM LISTING APPENDIX SUBMITTED ON A COMPACT DISC AND INCORPORATION BY REFERENCE OF THE MATERIAL ON THE COMPACT DISC. THE TOTAL NUMBER OF COMPACT DISCS INCLUDING DUPLICATES AND THE FILES ON EACH COMPACT DISC SHALL BE SPECIFIED

None.

BACKGROUND OF THE INVENTION

Nature provides many resources that can be used to reduce dependence on coal, oil, gas, and nuclear for powering our homes, offices, factories, and modes of transportation. Solar and wind power have been the most used natural resources to supplement coal, oil, gas, and nuclear for powering and heating homes, offices, and factories. Prototypes for gathering energy from waves and tides have also been constructed and are being evaluated as a supplement to coal, oil, gas and nuclear as well. In addition, much work has been done in the area of rooftop solar photovoltaic (PV) cells for supplementing the grid (P. Fairley, "How Rooftop Solar Can Stabilize the Grid," IEEE Spectrum, February 2015, p 10.). Solar powered PV cells have shown the most promise when it comes to providing electric power for planes and drones (http://info.solarimpulse.com/en/our-adventure/solar-impulse-2/#.VlzB9GaFPIU), (http://www-.gizmag.com/solara-uav-atmospheric-satellite/28886/).

There is another natural resource that has not been mined as an alternate source of energy: the earth's magnetic field. With average field strength approximately $0.5 \times 10^{-4}$ Tesla (T) around the world, it is easy to see why this resource has been overlooked. If a system to mine the earth's magnetic field is developed for a plane or drone using moving electrical wire after Faraday then Maxwell, even the most efficient aluminum wire requires an impractical length to generate a small amount of power at a usable voltage. As good as the electrical properties of aluminum wire are, they are not sufficient for this application. It is clear that a disruptive technology is needed to mine the earth's magnetic field to power planes and drones in lieu of solar PV technology.

Such a disruptive technology, graphene (The Royal Swedish Academy of Sciences, "Scientific Background on the Nobel Prize in Physics 2010," Kungl. Vetenskaps-Akademien, 5 Oct. 2010.) which is used in EcoCharge, is now at an early stage of development. Graphene has excellent electrical properties in the form of high conductivity and low resistivity, is extremely strong and durable, and is relatively inexpensive. It is now being produced in sheets (http://www.graphene-info.com/sony-developed-new-r2r-method-make-graphene-produced-100-meter-long-sheet) large enough to be used for EcoCharge. In addition, MIT has set up an industrial scale graphene printing press in its graphene lab (http://idealab.talkingpointsmemo.com/2011/09/mit-setting-up-industrial-scale-graphene-printing-press.php) and Purdue University spin-off BlueVine Graphene Industries, Inc. (http://www.purdue.edu/newsroom/releases/2014/Q3/purdue-based-startup-scales-up-graphene-production,-develops-biosensors-and-supercapacitors.html) produced roll-to-roll graphene before losing funding with the founders continuing research and development at Purdue's Birk Nanotechnology Center. In addition, novel research (A. Chakrabarti, J. Lu, J. C. Skrabutenas, T. Xu, J. A. Maguire, and N. S. Hosmane, "Conversion of Carbon Dioxide to Few-Layer Graphene," J. Mater. Chem, 2011, 21, 9491.) aims to contribute to the reversal of global warming by converting carbon dioxide in the atmosphere to sheets of graphene. Finally, the European Union has selected graphene research and development as one of its ten year objectives with funding of approximately one billion dollars.

The unique feature of graphene for mining the earth's magnetic field is its ability to conduct electricity in low resistivity, two-dimensional sheets. In effect, graphene is a two-dimensional "wire" that will generate current proportional to its resistivity, area, and orientation and motion with respect to the earth's magnetic field. As will be shown below, these properties provide a significant multiplier to earth's weak magnetic field yielding a feasible source of ecologically clean electric power for planes and drones. Not only is it ecologically clean but it is constant, day and night, through typical plane (39,000 ft.) and drone (65,000 ft.) altitudes (https://www.ngdc.noaa.gov/geomag/WMM/DoD-WMM.shtml) solving the solar regulation problem faced by current solar powered planes and drones from night time loss of sunlight.

EcoCharge units convert earth's magnetic field to electrical current continuously powering planes and drones. Planes and drones are general categories including all types of airborne vehicles. The basic EcoCharge concept of using graphene for the conversion medium was taught by U.S. Pat. No. 9,130,414 B2, EcoCharge System With Layered Graphene Sheets for Generating EMF From the Earth's Magnetic Field to Power Electric Vehicles, Sep. 8, 2015. Many of the present EcoCharge Powered Plane and Drone implementation techniques are also taught by U.S. Pat. No. 9,130,414 B2 and will be noted herein. As will be shown below, the EcoCharge Planes and Drones application is enough different from U.S. Pat. No. 9,130,414 B2 to warrant a separate patent application. For the vehicle mounted application, U.S. Pat. No. 9,130,414 B2, EcoCharge units are mounted on the axles and driveshaft of the vehicle, orthogonal to one another and with obvious size and weight restrictions, in order to generate electrical power when the vehicle is moving at any orientation to the earth's magnetic field. For the present plane and drone application, it is a matter of replacing many heavy PV cells and complex wiring with much lighter weight, simply wired orthogonal EcoCharge units allowing longer and faster flights with additional capabilities such as more cargo and passengers.

BRIEF SUMMARY OF THE INVENTION

In general, EcoCharge units comprising the plane and drone implementation will be mounted in the gondola or fuselage and wing orthogonal to one another to maximize the conversion of the earth's magnetic field to electrical energy. Conversion of magnetic to electrical energy is a maximum when the graphene sheets and the earth's magnetic field are oriented at 0° with respect to one another and the orthogonal orientation of the two EcoCharge units maximize this process as shown in the Performance section below. There is nothing that blocks or shields magnetic fields (A. Green, "Shielding Magnetic Fields," The Industrial Physicist, American Institute of Physics, October/November 2001.) so EcoCharge systems can be deployed inside the gondola or fuselage and wings for protection from the environment.

Figure 1:
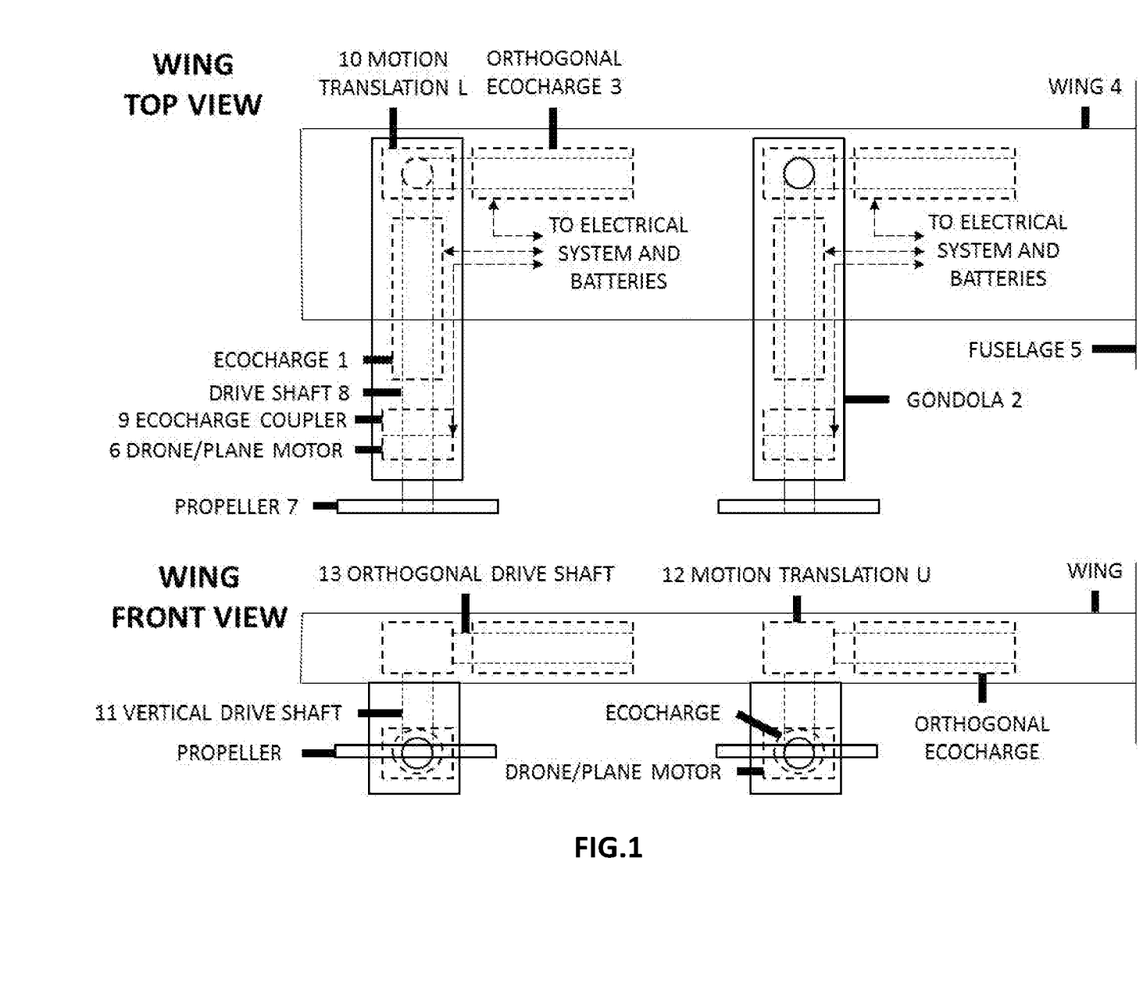
FIG. 1 is a sketch (not to scale) of the EcoCharge plane and drone concept showing one wing supporting two drive trains for the general electric plane application.

As shown in FIG. 1 for a plane example, the basic EcoCharge unit 1 of U.S. Pat. No. 9,130,414 B2 is mounted in the gondola 2 while an identical, orthogonal EcoCharge unit 3 is mounted in the wing 4. The EcoCharge unit 1 shown mounted in the gondola 2 could be mounted in the fuselage 5 if a gondola is not available like many drones. Both EcoCharge units are coupled to and driven by the plane or drone motor 6 which also drives the propeller 7.

When the plane/drone motor 6 drives the EcoCharge units, the graphene sheets rotate and convert the earth's magnetic field into electromotive force (emf) causing electric current to flow as a function of driveshaft angular velocity and orientation to the earth's magnetic field. Electric current from the graphene sheets is routed to the plane/drone electrical system where it is used to charge the batteries. It will be shown below in the Performance section using specific examples assumed for feasibility analysis that the proposed EcoCharge system can generate 15 kiloWatts Root-Mean-Square (kW RMS) for a Titan Aerospace Solara 50 type drone and 60 kW RMS for a Solar Impulse 2 type plane, continuously day and night, at a driveshaft angular velocity of 3,000 revolutions per minute (rpm). It is estimated that the EcoCharge based system for the Solara 50 type drone will replace about 200 lbs of PV cells generating 7 kW RMS when sunlight is present with two orthogonal EcoCharge units weighing 16 lbs while replacing 3,000 lbs of PV cells generating 50 kW RMS when sunlight is present with 4×2 orthogonal EcoCharge units weighing 64 lbs for the Solar Impulse 2 type plane.

BRIEF DESCRIPTION OF THE SEVERAL VIEWS OF THE DRAWING (IF ANY)

DETAILED DESCRIPTION OF THE INVENTION

Introduction

EcoCharge units utilize a technology breakthrough in materials, graphene, to mine the earth's magnetic field for an ecologically clean source of electrical energy to continuously power planes and drones. Magnetic fields are not shielded by structures allowing EcoCharge units to be mounted inside a gondola/fuselage or wing for protection from the environment. In the Solar Impulse 2 plane like example in the Performance section below, it is estimated that 4×2 orthogonal EcoCharge units weighing 64 lbs and generating 60 kW RMS of power day and night replaces 3,000 lbs of PV cells generating 50 kW RMS during daylight assuming a drive shaft rotating at 3,000 rpm. The Titan Aerospace Solara 50 drone like example uses 2 orthogonal EcoCharge units weighing 16 lbs and generating 15 kW RMS day and night replacing 200 lbs of PV cells generating 7 kW RMS during daylight assuming a drive shaft rotating at 3,000 rpm. Further, plots are provided showing EcoCharge output power versus rpm assuming a reasonable plane/drone propeller rotation limit of 4,000 rpm.

System Description

Example systems are used to enable a more detailed description of the proposed invention. The purpose here is to show that EcoCharge powered planes and drones are feasible while not limiting present and future implementation possibilities. There will be additional architecture choices as EcoCharge is applied to different circumstances and as technology advances in the future.

Figure 2:
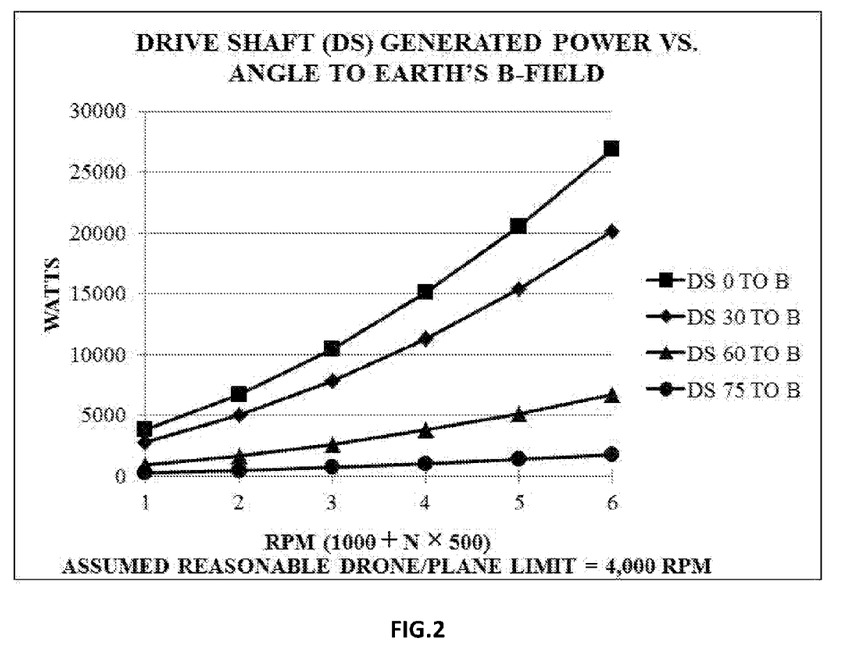
FIG. 2 is a plot of EcoCharge driveshaft (in fuselage or gondola) generated power versus angle to the earth's magnetic field.
Figure 3:
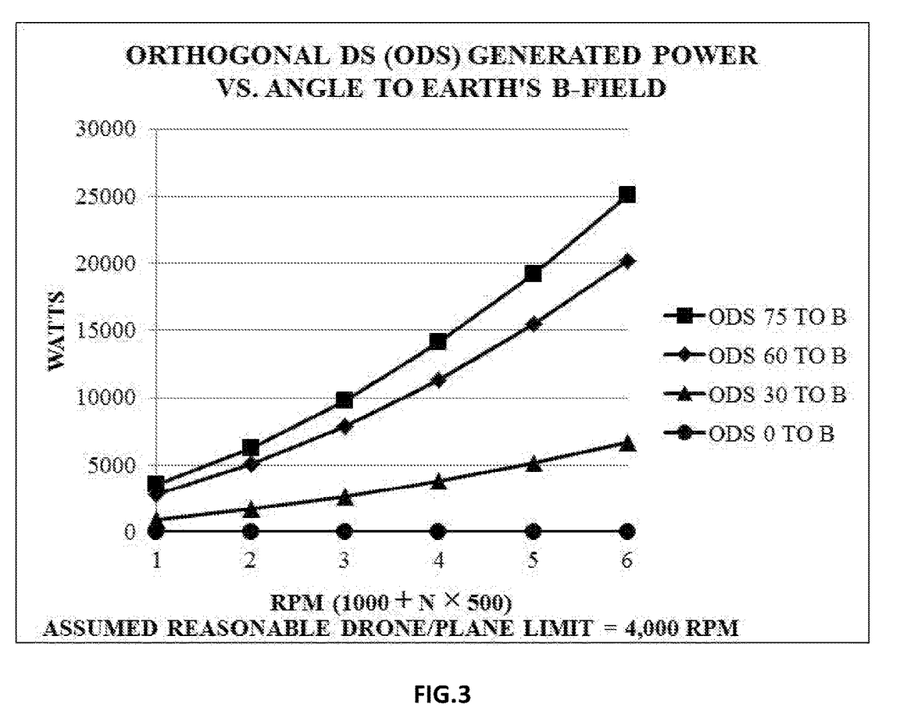
FIG. 3 is a plot of EcoCharge orthogonal drive shaft (in wing) generated power versus angle to the earth's magnetic field.
Figure 4:
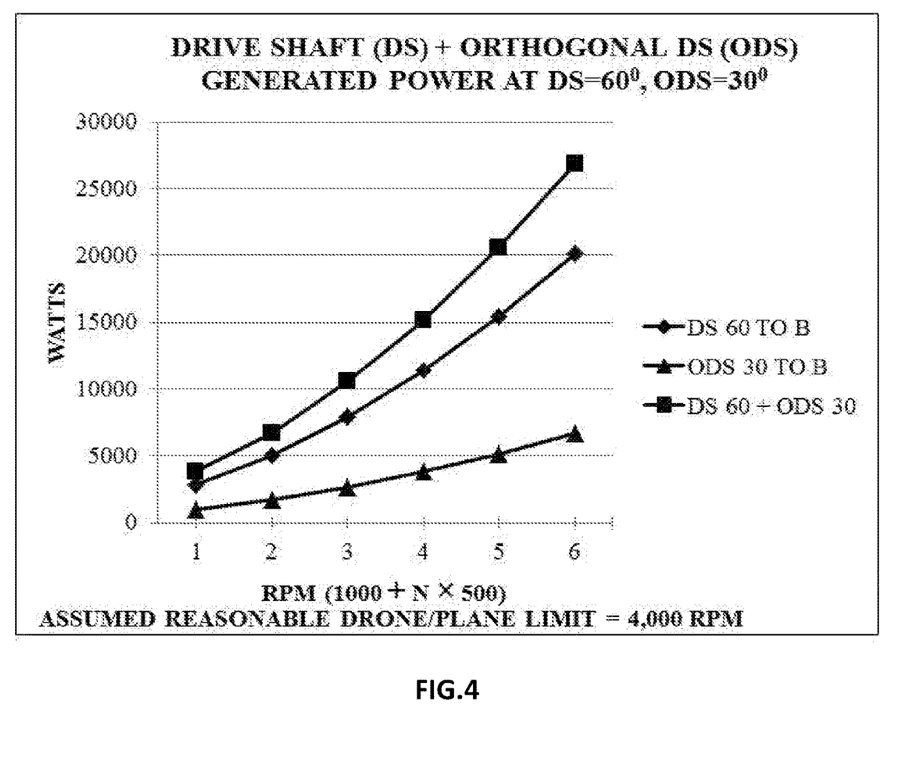
FIG. 4 is a plot of drive shaft (DS) plus orthogonal drive shaft (ODS) generated power at DS=60° and ODS=30° to the earth's magnetic field.

The Solar Impulse 2 plane like example used in this patent application is based on the sketch (not to scale) shown in FIG. 1. For simplicity, a single wing 4 with two gondolas 2 is shown. Each gondola contains a drive train and an orthogonal EcoCharge unit mounted in the wing. The Solara 50 drone like example assumes a single drive train with an EcoCharge unit mounted in the fuselage and an orthogonal EcoCharge unit mounted in the wing. For these examples, it is assumed that the drive shaft is rotating at 3,000 rpm. A more complete analysis will be shown later in the Performance section where parametric curves are plotted for drive shaft rotation between 1,500-4,000 rpm (FIG. 2, FIG. 3, and FIG. 4).

As shown in FIG. 1 for the plane example, the basic EcoCharge unit 1 of U.S. Pat. No. 9,130,414 B2 is mounted in the gondolas 2 while identical orthogonal EcoCharge units 3 are mounted in the wing 4. All of the detailed description provided in U.S. Pat. No. 9,130,414 B2 applies for each EcoCharge unit depicted in FIG. 1, including dimensions. This assumption is not meant to limit the use of various sized EcoCharge units but is meant to simplify the current detailed description. Various sized EcoCharge units could be used in the future to provide different amounts of power to differently designed planes and drones. The EcoCharge unit 1 shown mounted in the gondola 2 could be mounted in the fuselage 5 if a gondola is not available like many drones. Both orthogonal EcoCharge units are coupled to and driven by the plane or drone motor 6 which also drives the propeller 7. One source of custom electric motors providing access to the driveshaft at the front and rear of the motor is Baldor.

The plane/drone motor 6, located in the gondola for this example, drives the propeller 7 and is coupled to the drive shaft 8 by the EcoCharge coupler 9. The gondola based EcoCharge unit 1 is mounted to the drive shaft 8 allowing the graphene sheets inside the EcoCharge unit 1 to rotate when the drive shaft 8 rotates. The drive shaft 8 couples to the lower motion translation L 10 unit (wing top view) where gearing is used to translate the horizontal rotational motion from the motor 6 to the vertical drive shaft 11. Vertical rotational motion from the vertical drive shaft 11 is translated to orthogonal rotational motion using gearing in the upper motion translation U 12 unit located in the wing (wing front view) which couples to the orthogonal drive shaft 13 in the wing. The orthogonal EcoCharge unit 3 is mounted to the orthogonal drive shaft 13 allowing it to rotate synchronous with and orthogonal to EcoCharge unit 1. Electrical power generated in the EcoCharge units is wired to the electrical system to maintain the batteries. Power from the electrical system is wired to the electrical motors to power the drive trains.

For the Solar Impulse 2 plane like example, the functional description above applies to the second drive train shown in FIG. 1 as well as the two drive trains in the second wing which is not shown for simplicity. For the Solara 50 drone like example, the functional description above applies to the single drive train used in the smaller drone with EcoCharge unit 1 mounted in the fuselage and the orthogonal EcoCharge unit 3 mounted in the wing, for example.

Performance

The purpose of the Performance Section is to show feasibility of the EcoCharge plane and drone concept by determining pertinent performance parameters using well known methods and equations. In order to provide realistic results, the specific example used in U.S. Pat. No. 9,130,414 B2 has been modified to fit the plane and drone examples. Analyzing specific examples is not intended to limit the scope of this patent application but to serve as realistic test cases to verify feasibility of EcoCharge powered planes and drones. The claims below will be used to define the breadth of this EcoCharge patent application.

As realistic and illustrative examples for analysis assume:
1. The plane or drone drive shaft rotates at 3,000 revolutions per minute (rpm).
2. The plane or drone drive shaft frequency f=3,000 rpm/60 seconds/minute=50 rps.
3. The angular velocity of the plane or drone drive shaft $\omega=2\pi 50$ rps.
4. The diameter of the plane or drone drive shaft is d=0.06352 m (2.5").
5. The width of the graphene sheets mounted on the plane or drone drive shaft $w_g$=1.493 m (4.9').
6. The area of the graphene sheets exposed to the earth's magnetic field $A=\pi \cdot d \cdot w_g=0.3$ m².
7. The assumption is that graphene sheets can be layered to support the EcoCharge application given the current state of semiconductor production technology and continuing Moore's Law advances. While there has not been much work to date on stacking or layering graphene sheets (L. Zhang, et al, "The Experimental Observation of Quantum Hall Effect of I=3 Chiral Quasiparticles in Trilayer Graphene," Nature Physics 7, 953-957 (2011).), (X. Li, et al, "Transfer of Large-Area Graphene Films for High-Performance Transparent Conductive Electrodes," Nano Letters, Vol. 9, No. 12, 4359-4363, 2009.), and (Graphene Technologies, http://www.graphenetechnologies.com/index.htm), an application such as EcoCharge hopefully will stimulate interest and advancements in the many graphene centers that have been established at prestigious universities such as MIT mentioned earlier.
8. The earth's magnetic field strength, B, is estimated at $B=0.5\times 10^{-4}$ Tesla (T).
9. $\theta=0°$ initially (cos 0°=1).
10. Assume sufficient layers of graphene to yield a total graphene resistance $R_g$=1 m$\Omega$ for good power transfer through the tabs and commutator brushes defined in U.S. Pat. No. 9,130,414 B2.
11. Assume acceptable power transfer through the series combination of two tab and two commutator brush resistances is provided when the tab resistance is $R_t$=3.75 m$\Omega$ and the brush resistance is $R_b$=1.25 m$\Omega$.
12. Assume a reasonable tab length is 0.0127 m (0.5"), a reasonable brush length is 0.0032 m (0.125"), and tabs and brushes are composed 4,059 sheets of graphene for simplicity.
13. For purposes of this patent application, EcoCharge output power will be calculated across the commutator and brush assembly in a no load configuration given the electrical load will vary between electric systems in specific models of electric planes and drones. It is assumed that appropriate electrical matching techniques will be applied to minimize power transfer losses between EcoCharge and the electric plane or drone electric system.
14. EcoCharge generated power will be left in terms of W RMS at 12.3 V RMS allowing electric plane or drone manufacturers to convert to voltage values needed for their specific models.

Performance—Power Generated From the Earth's Magnetic Field

The derivations and calculations in U.S. Pat. No. 9,130,414 B2 leading up to and including EcoCharge power generated from the earth's magnetic field remain valid for the assumptions listed above for planes and drones. EcoCharge power generated from the earth's magnetic field given assumptions 1-14 above is repeated here for convenience:

$P_o$=15.1 kW RMS.

Performance—EcoCharge Power: Earth's Magnetic Field Angle Versus RPM

As mentioned above in the Brief Summary of the Invention, EcoCharge systems can be mounted orthogonal to one another to maximize electric power mined from the earth's magnetic field. Conversion of magnetic to electrical energy is a maximum when the graphene sheets and the earth's magnetic field are oriented at 0° to one another and zero when their orientation is 90°. If the drive shaft and orthogonal drive shaft mounted systems are properly balanced, as the planes and drones maneuver and change orientation with respect to the earth's magnetic field electrical power contributions from the orthogonally mounted systems will combine to supply the maximum achievable power.

EcoCharge drive shaft and orthogonal drive shaft generated power derived in U.S. Pat. No. 9,130,414 B2 remains valid for the current planes and drones application except there is a direct relationship of electrical power versus rpm instead of vehicle velocity/rpm to electrical power.

For purpose of this patent application, FIG. 2, FIG. 3, and FIG. 4 were generated with Microsoft Excel using results from U.S. Pat. No. 9,130,414 B2 in order to provide a wider range of expected EcoCharge output power versus drive shaft rpm and to show the contribution of orthogonality. FIG. 2 shows how EcoCharge drive shaft (DS) generated power increases with increasing rpm (1500 to 4000 rpm in 500 rpm increments) and decreases with increasing angle (0°, 30°, 60°, and 75°) to the earth's magnetic field (B). FIG. 3 shows how EcoCharge orthogonal driveshaft (ODS) generated power also increases with increasing rpm (1500 to 4000 rpm in 500 rpm increments) but increases with increasing angle (0°, 30°, 60°, and 75°) to the earth's magnetic field (B). FIG. 4 shows drive shaft (DS) generated power, orthogonal drive shaft (ODS) generated power, and drive shaft generated power plus orthogonal drive shaft generated power (DS+ODS) for the specific case of the plane or drone at 30° with respect to the earth's magnetic field. Note that the plane or drone angle with respect to the earth's magnetic field is the same as the drive shaft angle. FIG. 4 shows that when the plane or drone is at an angle with respect to the earth's magnetic field, EcoCharge generated power can be maximized by combining drive shaft generated power with orthogonal drive shaft generated power, i.e. the (DS+ODS) curve at 30° is the same as the DS curve at 0°.

Performance—EcoCharge Weight Budget

The weight budget is an estimate of the weight of two orthogonal EcoCharge units from the sum of its components. It is not meant to be the final word on weight, but an estimate, as the weight of each EcoCharge plane or drone system will depend on its configuration, the material it is constructed with, and the plane or drone in which it is mounted. The size of the EcoCharge system will vary with available space on the plane or drone. Some planes or drones may only have room for a system that provides 50% or 75% of the achievable power from the above assumed example. The point is, the EcoCharge configuration is flexible and is a small addition of weight to the drive train of the electric plane or drone that will not significantly affect aerodynamics.

Figure 5:
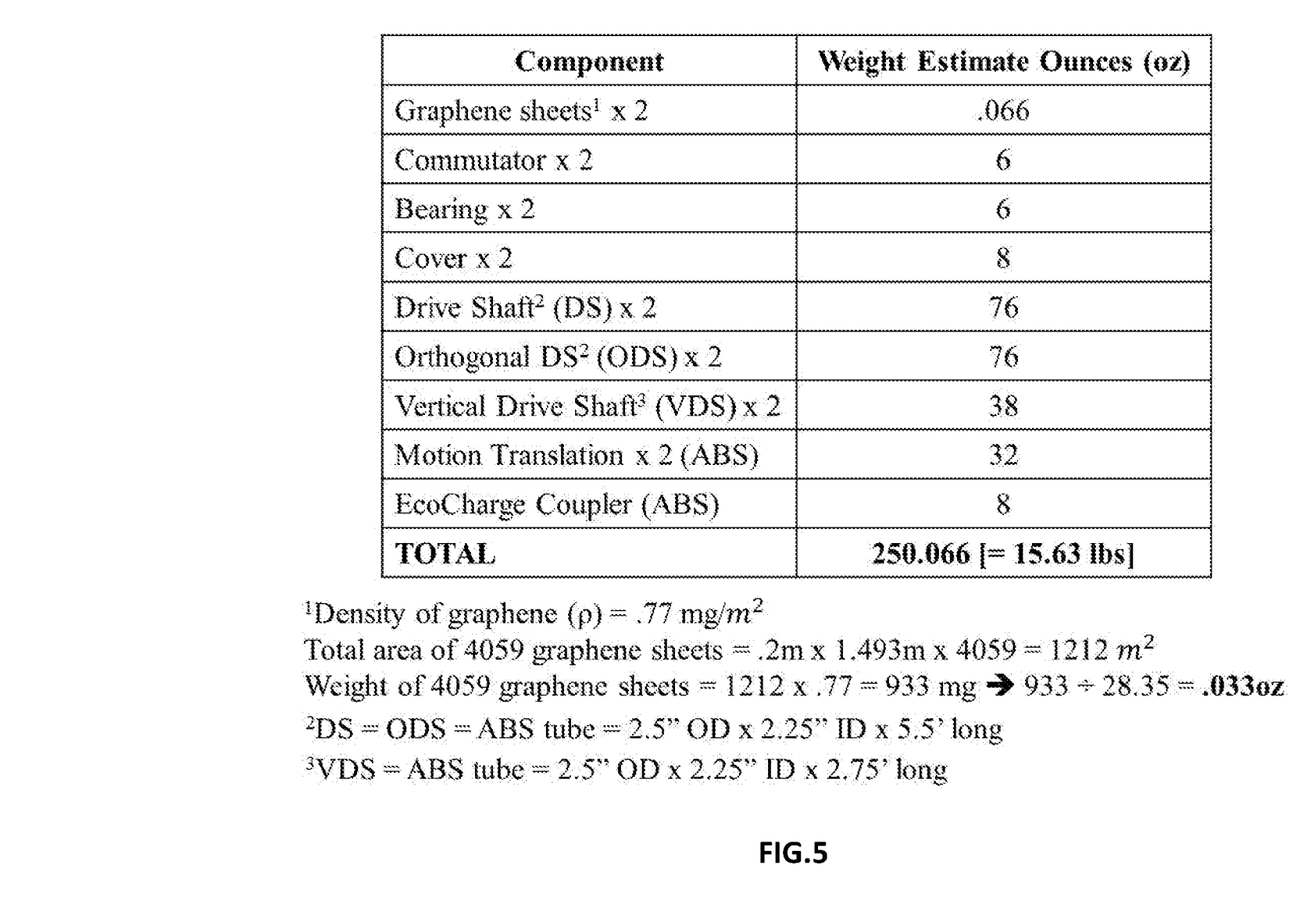
FIG. 5 is a weight budget for two orthogonal EcoCharge units being used for the plane and drone concept.

The weight budget is shown in FIG. 5. As shown, weights for the graphene sheets, commutator, bearing and cover are taken from U.S. Pat. No. 9,130,414 B2 and doubled to account for the two orthogonal EcoCharge units being used. The DS, ODS, VDS, motion translation, and EcoCharge coupler are assumed to be constructed from acrylonitrile butadiene styrene (ABS) with the given dimensions and weights shown. Note that these components could be constructed with other materials dictated by the specific application as the need arises. As shown in FIG. 5, the total weight of two orthogonal EcoCharge units is 15.63 lbs.

Performance—EcoCharge Plane and Drone Examples

For the Solar Impulse 2 like electric plane example, four of the orthogonal EcoCharge units are assumed, two for each wing, resulting in a total added weight of approximately 64 lbs generating approximately 60 kW RMS of electrical power continuously day and night. The EcoCharge units replace approximately 3,000 lbs of PV cells generating approximately 50 kW RMS of electrical power but only during daylight (http://info.solarimpulse.com/en/our-adventure/solar-impulse-2/#.VlzB9GaFPIU0). Reduced weight and continuous power translate into longer and faster flights with additional payloads and passengers allowing significant electric plane redesign which is left to qualified aeronautical engineers.

For the Solara 50 like drone example, one of the orthogonal EcoCharge units is assumed resulting in a total added weight of approximately 16 lbs generating approximately 15 kW RMS of electrical power continuously day and night. The EcoCharge units replace approximately 200 lbs of PV cells generating approximately 7 kW RMS of electrical power but only during daylight (http://www.gizmag.com/solara-uav-atmospheric-satellite/28886/). Reduced weight and continuous power translate into longer and faster flights with additional payloads allowing significant electric drone redesign which is left to qualified aeronautical engineers.

What is claimed is:

1. A method comprising:
arranging a first graphene sheet 1 on a rotatable shaft 11;
arranging a second graphene sheet 3 on a rotatable, orthogonal shaft 13;
rotating the shaft within the magnetic field of the earth;
rotating the orthogonal shaft within the magnetic field of the earth;
inducing an electric current in the graphene sheets in response to the rotation of the shaft and the orthogonal shaft through the magnetic field of the earth; and
supplying the electric current to an electrical system in an electric plane or drone.

2. The method of claim 1, wherein supplying the electric current to the electrical system of an electric plane or drone comprises using a commutator to electrically connect the first and second graphene sheet to the electrical system.

3. The method of claim 2, wherein electrically connecting the first and second graphene sheet to the electrical system of the electric plane or drone comprises electrically connecting the first and second graphene sheet to the electrical system through graphene brushes of the commutator.

4. The method of claim 1, wherein:
arranging the first and second graphene sheet on the rotatable shaft comprises arranging graphene sheets on a plurality of rotatable shafts and orthogonal rotatable shafts inside the electric plane or drone;
rotating the shaft within the magnetic field of the earth comprises rotating the plurality of shafts and orthogonal shafts within the magnetic field of the earth;
inducing an electric current in the first and second graphene sheet in response to the rotation of the shaft through the magnetic field of the earth comprises inducing electric currents in the first and second graphene sheets in response to the rotation of the plurality of shafts and orthogonal shafts; and
supplying the electric current to the electrical system comprises supplying the electric current from the first and second graphene sheets to the electrical system.

5. The method of claim 1, wherein arranging the first graphene sheet on the rotatable shaft comprises arranging a plurality of graphene sheets on the rotatable shaft.

6. The method of claim 1, wherein arranging the graphene sheet on the rotatable shaft comprises arranging a plurality of first and second graphene sheets on the rotatable, orthogonal shaft.

7. The method of claim 1, wherein arranging the first and second graphene sheet on the rotatable shaft comprises insulating the first and second graphene sheet from the rotatable shaft.

8. The method of claim 1, wherein arranging the first and second graphene sheet on the rotatable shaft comprises insulating the first and second graphene sheet from the rotatable, orthogonal shaft.

9. The method of claim 1, wherein supplying the electric current to the electrical system of the electric plane or drone comprises supplying the electric current to a battery to charge the battery.

10. The method of claim 1, wherein supplying the electric current to the electrical system of the electric plane or drone comprises supplying the electric current to an electric motor to power the electric motor.

11. The method of claim 1, wherein supplying the electric current to the electrical system comprises supplying the electric current to an electrical system of the electric plane or drone to power the electrical system.

12. An apparatus comprising:
a graphene sheet;
a rotatable shaft;
a rotatable, orthogonal shaft;
a mechanism to rotate the shaft and the orthogonal shaft driven by an electric motor; and
an electrical system,
wherein the graphene sheet is secured to the rotatable shaft and rotates with the rotatable shaft through the magnetic field of the earth;
wherein the graphene sheet is secured to the rotatable, orthogonal shaft and rotates with the rotatable, orthogonal shaft through the magnetic field of the earth;
wherein the mechanism to rotate the shaft and orthogonal shaft comprises a coupler, a motion translation lower, a vertical shaft, a motion translation upper;
wherein the mechanism is driven by the electric motor of the plane or drone which also drives a propeller of the plane or drone;
wherein rotation of the rotatable shaft and the orthogonal, rotatable shaft through the electric field of the earth induces an electric current in the graphene sheets;
wherein the graphene sheets are electrically connected to the electrical system of the plane or drone, and the electric current induced in the graphene sheets is supplied to the electrical system.

13. The apparatus of claim 12, further comprising a commutator, wherein the commutator electrically connects the graphene sheets to the electrical system of the plane or drone.

14. The apparatus of claim 13, wherein the commutator comprises graphene brushes, wherein the graphene brushes electrically connect the graphene sheets to the commutator.

15. The apparatus of claim 13, wherein the graphene sheet comprises a graphene connection tab, and wherein the graphene connection tab electrically connects the graphene sheet to the commutator.

16. The apparatus of claim 12, wherein the apparatus comprises a plurality of apparatus to match the number of electric motors on the plane or drone.

17. The apparatus of claim 12, further comprising an insulator ridge, wherein the insulator ridge is arranged between the graphene sheet and the rotatable shaft and electrically insulates the graphene sheet from the rotatable shaft.

18. The apparatus of claim 12, wherein the graphene sheet is one of a plurality of graphene sheets, wherein each of the plurality of graphene sheets is secured to the rotatable shaft, and wherein each of the plurality of graphene sheets is electrically connected to the electrical system of the electric plane or drone.

19. The apparatus of claim 12, wherein the rotatable shaft comprises a drive shaft inside the electric plane or drone.

20. The apparatus of claim 12, wherein the rotatable shaft comprises an orthogonal drive shaft inside the electric plane or drone.

21. The apparatus of claim 12, wherein the electrical system comprises a battery.

22. The apparatus of claim 12, wherein the electrical system comprises the electric motor or plurality of electric motors on the plane or drone.

* * * * *